United States Patent [19]

Reed et al.

[11] 4,294,641

[45] Oct. 13, 1981

[54] HEAT TRANSFER SHEETS

[76] Inventors: Kenneth J. Reed, Deer Park Rd., Wimbledon, London, S.W. 19; Alan L. Lythgoe, 25 Sene Park, Hythe, Kent, both of England

[21] Appl. No.: 55,929

[22] Filed: Jul. 6, 1979

Related U.S. Application Data

[63] Continuation of Ser. No. 817,707, Jul. 21, 1977, abandoned.

[30] Foreign Application Priority Data

Jul. 23, 1976 [GB] United Kingdom ............... 30925/76

[51] Int. Cl.[3] ......................... B32B 3/18; B41M 5/26; B44C 1/16

[52] U.S. Cl. .................................... 156/234; 156/240; 427/148; 427/256; 427/288; 427/314; 428/200; 428/206; 428/207; 428/409; 428/913; 428/914

[58] Field of Search ............... 156/230, 234, 238, 240, 156/277; 260/75 NK; 427/146, 152, 148, 256, 288, 314; 428/200, 202, 207, 913, 914, 206, 323, 327, 409

[56] References Cited

U.S. PATENT DOCUMENTS

| | | | |
|---|---|---|---|
| 3,684,769 | 8/1972 | Abbott et al. | 260/75 NK |
| 4,027,345 | 6/1977 | Fujisawa et al. | 427/152 X |
| 4,033,770 | 7/1977 | De Haes et al. | 156/230 X |
| 4,038,123 | 7/1977 | Sammis | 427/152 X |
| 4,058,644 | 11/1977 | De Vries | 428/914 X |
| 4,066,810 | 1/1978 | Kosaka et al. | 428/914 X |
| 4,068,033 | 1/1978 | Meade | 428/914 X |

*Primary Examiner*—Bruce H. Hess
*Attorney, Agent, or Firm*—Neil F. Markva

[57] ABSTRACT

A heat transfer is disclosed which is primarily intended for application of designs to textiles. The transfer comprises a flexible carrier sheet bearing a transfer layer of a polymer composition which is rendered non-blocking at normal room temperatures by a particulate solid dispersed therein. The particulate solid is selected so that at the melting temperature of the layer it is either removed completely by sublimation or is converted to a form which does not interfere with liquid phase transfer of the design to the textile.

34 Claims, No Drawings

HEAT TRANSFER SHEETS

This is a continuation of application Ser. No. 817,707 filed July 21, 1977, now abandoned.

BACKGROUND OF THE INVENTION (i) Field of the Invention

This invention relates to a method of printing textiles and other materials using a transfer sheet or web which carries a pre-printed pattern or design.

(ii) Prior Art

Strenuous efforts have been made for many years to develop a transfer printing system for decoration of textiles since a satisfactory system of this kind has many advantages. One obvious advantage to the textile manufacturer is that he does not need to invest in expensive printing equipment or to employ the necessary skilled printing operatives. Almost as important an advantage is that it enables the textile manufacturer to hold stock in unprinted fabric and transfer webs, which involves a much reduced investment in stock and greater flexibility.

Despite these advantages, only one type of transfer printing system has become widely used for textile decoration and that is the vapor phase transfer system. In vapor phase transfer systems, a design is printed on a carrier web using an ink containing dyestuffs which sublime at temperatures of about 180° to 250° C. The carrier web is placed in contact with the fabric to be decorated and the design transferred by heating the carrier web, which is usually paper, to a temperature at which much of the dyestuffs in the design sublime and recondense onto the fabric. A typical vapor transfer method of this kind is described in British Pat. No. 1,433,763 (Sublistatic S.A.) Fabric dyed by vapor phase transfer has good "handle" and in the case of polyester fiber the process results in reasonably fast dyeing. The main limitations of vapor phase, dyeing, however, are that it is not suitable for dyeing cellulosic fibers such as cotton, since sublimable dyes are not fast towards such fibers, and also the process is rather slow, requiring a residence time of up to 30 seconds to complete dye transfer.

German Patent Application Ser. No. 2,505,940 (Lewis and Rattee) describes a process for applying a decoration to a textile from a transfer web in which a thermoplastic film incorporating the decoration is transferred bodily from a carrier web and adhered to the textile system, the thermoplastic film is formulated as a thermoplastic adhesive so that under the influence of heat it becomes soft and tacky. By selecting a carrier sheet having a release surface (e.g. a siliconized paper) the hot, tacky film, incorporating the design, can be made to adhere to the textile and, on subsequent cooling, the film can be stripped from the carrier, leaving the film bonded to the surface of the textile. Several problems soon become apparent when attempting to carry out the Lewis and Rattee process in practice. A fundamental problem is that the dyes or pigments forming the design in the transferred film have to be conveyed from the film into the fibers of the fabric and the polymer matrix forming the film removed or dispersed since otherwise the fabric has the appearance and handle of a plastic coated material. A satisfactory solution to this problem is not apparent from the German application since subsequent heating of the fabric bearing the transferred film in contact with metal plates or rollers would be likely to result in contamination of the plates and rollers with the tacky mass produced by heating the film. A further difficulty arising from the Lewis and Rattee system is that high quality printing onto surfaces having release characteristics is not possible since the poor wettability of such surfaces results in repellency and other printing defects. Finally, the need to cool the film prior to stripping introduces an undesirable limitation on the maximum possible speed of the process.

Attempts have also been made to produce a transfer system in which a liquid printing ink is reconstituted at the instance of application to the textile fabric. Theoretically such a system would be expected to be the most satisfactory approach since it would seem to reproduce most closely conventional printing from inked plates or rollers. In practice, successful realization of a system of liquid phase transfer has been thwarted by the problem of formulating an ink which would melt to a printable liquid at a temperature low enough not to damage the fabric and at the same time be solid and non-tacky at room temperature so that the transfer web or sheets can be stacked or reeled without blocking or marking off. Prior systems of this kind therefore are essentially compromises in that some blocking of the transfer sheets has to be tolerated and relatively high temperatures and transfer pressures adopted to ensure transfer of the design to the fabric. Severe conditions of operating temperatures and pressures are undesirable since they may distort or damage the fabric. Prior systems of this latter type are described in U.S. Pat. Nos. 2,583,286 (Albini-Colombo) and 2,911,280 (Cicogna).

SUMMARY OF THE INVENTION

The present invention is based on the discovery that a printing ink, which is solid and non-blocking at room temperature but melts readily to a printable ink at relatively low temperatures, can be formulated by dispersing in the ink a substance which is solid and forms a phase discrete from the ink vehicle at room temperature but which melts at the operational temperature to a liquid which at least does not increase the viscosity of the remaining ingredients of the ink or is removable at such temperature by sublimation.

According to the present invention there is provided a heat transfer which comprises a flexible support sheet or web bearing a layer of polymer composition having dispersed in at least a surface portion thereof, a non-tacky particulate solid. The layer is non-blocking at normal room temperature and melts at elevated temperature to a liquid having a viscosity permitting printing of a surface placed in contact therewith, while said particulate solid sublimes at said elevated temperature or melts to a liquid which does not substantially increase the viscosity of the molten polymer composition.

DETAILS OF THE INVENTION

The heat transfers of the present invention are used to decorate textiles or other receptor materials by placing the transfer layer and receptor in contact and applying sufficient heat to melt the transfer layer while maintaining intimate contact between the transfer layer and the receptor, e.g. in a press. It has been determined that the mechanism of transfer involves the conversion of the transfer layer to a liquid film of relatively low viscosity which is transferred to the receptor in the liquid phase. Efficiency of transfer is good although the proportion of the polymer layer transferred depends on the relative absorbency of the receptor and the carrier sheet. When transferring designs to textiles and receptors of similar high degree of absorbency, efficiency of transfer is excellent and the transfer layer flows into the receptor to an extent depending on a number of factors including film thickness of the transfer layer and contact pressure.

In formulating the compositions of the transfer layer the aim should be to achieve a formulation which has a melt viscosity at the operational temperature of the heat transfer which is in the range normally selected for conventional printing of the receptor with liquid inks. Optimum melt viscosities will depend on the nature of receptors used and transfer conditions including transfer contact pressures but the melt viscosity should in general be less than 100 poise and normally less than 30 poise. When using the heat transfers at low contact pressures, e.g. in the region of 1 to 5 pounds per square inch, the melt viscosity is preferably less than 15 poise, e.g. 1 to 10 poise or less.

It will of course be apparent that the particulate solid should be a non-tacky solid at normal toom temperatures and melt or sublime at the operational transfer temperature so as not to interfere with the flow of molten ink into the material to be printed.

Heat transfer in the liquid phase which produces flow into an absorbent substrate has many advantages since, for example, in the case of a textile substrate, the important physical properties of the substrate such as porosity, surface texture and "handle" are substantially retained after the heat transfer and at the same time the transferred design exhibits excellent fastness properties such as crock-resistance, wash-fastness, dry-clean resistance and heat resistance, which are important in textile substrates for use in clothing.

All manner of absorbent substrates can be decorated in accordance with the process of the present invention and these include woven and knitted fabrics for clothing, furnishings and packaging, non-woven textiles, fiber glass, leather, paper and other fibrous material such as carpets and foam plastics. The substrates are absorbent by reason of their fibrous or cellular structure or surface roughness and their absorbency is indicated by their oil absorption value.

Transfer at melt viscosities which are higher than those of conventional liquid printing inks may be effected by application of higher pressures or vacuum assistance to assist flow into the substrate. The liquid phase transfer of the present invention therefore, excludes transfer in the solid state in which the transfer layer is retained as a coherent film during heat transfer and would produce a decorated substrate in which the transfer layer exists as a film or skin on the surface of the substrate. Such solid state transfer involves retention of a coherent film layer after transfer and materially alters the physical properties of the substrate such as porosity and surface texture and produces a label like effect.

The function of the particulate solid, tack reducing agent is to enable the heat transfer sheets to be stacked and transported under normal ambient conditions without blocking of the sheets or marking off of the transfer layer onto adjacent sheets. In order to achieve this desirable result, the particulate solid should be present in at least the surface of the transfer layer as discrete particles in the matrix formed by the polymer layer. Care should be taken to avoid the formation of solid solutions of the particulate solid in the polymer composition. That is, the tack reducing agent must be a separate phase in the polymer composition. The desired non-blocking or tack reducing characteristics are in general only achieved when there is a heterogeneous transfer layer comprising discrete solid particles of the anti-blocking or tack reducing component in the polymer composition.

In selecting suitable particulate solids, materials which dissolve readily in solvents for the polymer composition are best avoided, since with such materials it is difficult to prepare the heat transfers of the invention without forming a solution of the particulate solid in the polymer composition.

While a degree of incompatability between the particulate solid and the polymer components is desirable at low temperature, there are advantages in selecting a particulate solid which dissolves in the polymer composition (or vice-versa) at their melting temperature. An important advantage of the latter type of materials is that the particulate solid is thereby removed from the surface film of the transfer layer and cannot therefore interfere with transfer of the liquid polymer layer to the receptor. Dissolution of the particulate solid in the polymer component of the transfer layer at or close to the melt temperature also has the advantage that the melting point of the polymer components is depressed and further the formation of a solution will normally reduce the melt viscosity of the transfer layer.

Particulate solids which contain ester, amide or ketone groups are frequently soluble in a wide range of polymers and represent a preferred class of particulate solids.

In general the particulate solids used in the heat transfers of the present invention should have a melting point of at least about 60° C. If the melting point is significantly lower than this, the product will not possess sufficient storage stability at high ambient temperatures sometimes encountered in hot climates. The upper limit of the melting point (or sublimation temperature) of the particulate solid is determined by the maximum working temperature of the receptor to which the design is to be applied and also of the carrier sheet. In the case of textiles the maximum permissible temperature for most fabrics is about 200° C. Because the polymer compositions which form the transfer layer are molten over a range of temperature (which is extended where the particulate solid forms a solution with the polymer components at the elevated temperature) it is often possible to formulate a transfer layer which, after heating to its melting temperature, will remain molten and quite fluid until it has cooled substantially below its initial melting temperature. As indicated above, solid esters, amides and ketones of aromatic, cyclic or short chain hydrocarbon radicals (especially 10 carbon atoms or less) are a preferred group of particulate solid materials which frequently form solutions with the polymer components when molten. Included within this group of particulate solid materials are substances sometimes referred to as solid plasticizers, e.g. aliphatic, aromatic and cycloaliphatic phthalates. Examples of specific materials which may be employed as the particulate solid in the heat transfers of the present invention are given with their melting point below:

| | MP. °C. |
|---|---|
| Octadecanamide | 102–104 |
| Dimethyl terephalate | 140–142 |
| Sorbitor hexa acetate | 100–4 |
| Dicylohexyl phthalate | 65 |
| p-Toluene-sulphonamide | 136–7 |
| N-Cyclohexyl sulphonamide | 86 |

-continued

| | MP. °C. |
|---|---|
| Diphenyl phthalate | 69 |
| Camphor | 176–178 |
| Heptachloronaphthalene | 115 |

Examples of particulate solids which, when melted form a phase separate from the polymer are actadecanamide, and low molecular weight polymers such as linear polyesters, polyamides and polyethylene.

Some of the above substances will sublime at the elevated temperatures at which the heat transfers are used e.g. dimethyl terephthalate and to a lesser extent camphor, and are thereby partly or wholly removed from the transfer layer composition during the heat induced transfer to the receptor.

The invention includes a method of marking a surface, such as a textile, which comprises applying to said surface a heat transfer comprising a coating of a polymer composition on a support sheet. The coating has discrete particles of a non-tacky solid in at least the exposed surface layer of said coating so that the said exposed surface is substantially non-blocking at normal room temperature. The polymer composition is exposed to a heat source, whereby the polymer composition melts and transfers to the surface to be marked and the non-tacky solid sublimes or melts to form a liquid mixture with the polymer composition which is not more viscous than the molten polymer composition alone.

The decoration of textiles in the liquid phase by the process of the present invention gives valuable results closely resembling the conventional decoration process of textiles by direct printing with liquid inks particularly in the retention of important physical properties of the substrate. However, the print quality of the decorated textiles produced by the present invention is substantially superior to that obtainable by direct printing particularly in the reproduction of fine detail and tones and in color register in multi-color printing. The transfer layer of the present invention has a predetermined thickness which also provides accurate color density control.

In one embodiment of the present invention, the transfer layer is transparent or translucent and is provided as a continuous coating or discrete areas of coating on the carrier sheet. The design or marking is printed or otherwise formed on the exposed surface of the transfer layer and on transfer. The printed design is carried with the liquefied layer into the substrate.

In an alternative embodiment, the transfer layer per se constitutes the design to be transferred to the substrate.

Since the transfer of the layer is carried out in the liquid phase, a continuous coherent layer is not transferred onto the surface of the substrate in such a manner which would substantially alter the physical properties of the substrate such as porosity or surface texture. The flow of the transfer material into the substrate itself contributes to the good fastness properties obtained in the transferred design.

The polymer base or components of the transfer layer may comprise one or more polymers, prepolymers or the like in admixture, a prepolymer being a monomer or a very low molecular weight polymer. In one embodiment of the invention the fastness properties of the transferred layer may be enhanced by using a polymer system which further polymerizes in situ in the substrate during or after the heat transfer process. In a particular embodiment of the present invention, a soft cross-linking polymer or two mutually reactive polymers or a polymer and a cross-linking agent or a prepolymer and a polymer may be employed in admixture in order to obtain polymerization in situ. In particular, the heat transfer may be conducted at a temperature such as to initiate the cross-linking reaction which can proceed to completion if necessary with further heating. Polymerization in situ may be performed by photopolymerization in which the transferred layer is exposed to ultra violet or electron beam radiation after stripping off the support sheet.

The extent of the flow properties required in the transfer layer on particular substrates is dependent on the substrate type and the end use of the substrate. For example, with a textile fabric requiring one-side decoration, flow is restricted to a depth of penetration which is just sufficient to provide fastness properties such as crock resistance and to retain textile physical properties such as surface texture "handle" and porosity. Alternatively, decoration of a textile fabric requiring uniform coloration through the entire thickness of the fabric requires substantially higher flow properties in the heated transfer layer. With a given substrate flow, properties are found to be dependent on the composition of the polymer base and thickness of the transfer layer and the temperature, dwell time and pressure of transfer and type of concentration of solid meltable material. All these decoration effects can be obtained by the process of the present invention.

The solid particulate material is most conveniently incorporated as a dispersion of fine particles in the polymer base of the transfer layer. This may be carried out by mechanically dispersing the solid meltable or sublimable materials as a powder in the polymer base prior to forming the transfer layer on the support sheet. Volatile organic solvents and water may be used to reduce the viscosity of the polymer base for preparing the transfer layer by coating or printing methods and these are evaporated to produce the dry transfer sheet. Where such solvents are used they are preferably chosen so that they do not dissolve the particulate solid materials to any significant extent.

The solid particulate material may also be incorporated in the transfer layer by applying it as a finely divided powder spray or dip to the surface of the transfer layer while the latter is in a tacky condition for example, before complete drying. This method of incorporation enables those solid particulate materials to be used which might otherwise be too soluble in the solvents for the polymer components. Excess powder may be removed by brushing or vaccum or both as on a bronzing machine. It may also be convenient to incorporate the solid meltable material in the polymer base in cold or hot solution or dispersion in volatile organic solvents or water, so that on cooling or drying the material is present as solid particles in the layer.

It is found that with certain combinations of polymer base and solid meltable material, the flow properties are retained for a period of time after cooling the transfer layer before making contact with the substrate. It is believed that such delayed flow is maintained until solidification of the solid material occurs which may be a slow crystallization process. Consequently, heat transfer can be carried out at a lower temperature than that reached during the heating stage which is useful for heat sensitive substrates and also allows heating of the transfer layer to be carried out as a separate stage prior to positioning the transfer layer in contact with the substrate.

Many heat softenable polymer bases which are particularly suitable for use in the present invention are tacky or at least will block or become damaged on handling and storage of the transfer sheets. Part of the solid particles contained in the layer actually exist in the exposed surface of the transfer layer where they eliminate tack and give non-blocking and excellent handling properties, and this is a major function of the solid material.

A polymer base which is soft and tacky at room temperature and has extremely good heat flow may thus be used and the transfer layer is solidified by a suitable concentration of particles of the solid material. Another function of the particulate solid is that the printability, drawing and typing properties of the transfer layer are also greatly improved by the inclusion of finely divided solid particles in the transfer layer. A fine matt surface is produced which is ideal for application of the design.

A continuous transfer layer can be applied to the support sheet by a coating process such as roller coating, reverse roll coating, wire bar coating or curtain coating. Continuous or discrete areas of transfer layer may be applied by printing or panel coating. Such a transfer layer may be colorless or colored to provide in the latter case a background color. The design layer is then overprinted or otherwise formed on the exposed surface of the transfer layer to form a composite transfer layer so that on transfer the design is carried with the liquefied transfer layer into the substrate. In all these cases the design layer need not contain a solid meltable component although flow is assisted if some meltable material is included. All the usual printing processes of lithography, letterpress, gravure, flexography, screen printing and jet printing can be employed for printing the design using single or multicolor printing presses and excellent print quality and fast ink setting and drying are obtained.

Similarly, drawing by pencil and pen, including felt-tip pen, painting by brush and spray, typing by ribbon and carbon paper and electrostatic printing are usable and in the latter method the solid particulate material must have a melting point or sublimation point above the temperature reached in the electrostatic printing machine. A design may be produced on the surface of the transfer layer by means of a dry transfer process in which for example a dry ink design is transferred to the layer from a dry transfer sheet of the kind described in British Pat. No. 959,670.

A clear transparent or colored transfer layer may also be applied to the support sheet after application of the design layer and alternatively the design layer may be sandwiched between the two transfer layers.

The design layer may also constitute the transfer layer per se and in this case is composed of heat softenable polymer base and solid, particulate material in addition to coloring matter or latent coloring matter. The colored design layer when printed by a thin film process such as gravure or flexography may be overprinted in register on a multi-station press with one or more workings of colorless design layer of similar composition to increase the thickness of the transfer layer to obtain adequate flow into relativey thick substrates such as textile fabrics. Alternatively, one or more workings of colorless layer may be first applied to the support sheet in discrete areas slightly larger than the final color design layer or layers to avoid subsequent registration problems with the printed design.

When a continuous transfer layer is applied to the support sheet various other functional properties can readily be imparted to it which are valuable when decorating particular absorbent substrates such as textiles for clothing. These functional properties include crease-resistant, flame resistant, intumescent properties, and heat-sealing properties, the latter being useful for fusible interlinings and applique work.

A sufficient concentration of solid, particulate material should be incorporated in the transfer layer to give non-blocking and good handling properties to the transfer sheet on storage and to exhibit liquid phase transfer when heated. When the transfer sheet is produced by overprinting the transfer layer, the concentration of solid particulate material required for printability is generally found to be such that a matt or semi-matt finish is produced on the transfer layer and generally a concentration range of 30-80% is required but it is understood that concentration is dependent on the particular polymer base and other factors already described.

Heat softenable polymers which can be used in the polymer base include acrylic, methacrylic, amino-formaldehyde, epoxy, vinyl, linear polyesters, alkyds, hydrocarbon resin, polyamide, polyurethane and chlorinated rubbers. Suitable monomers and prepolymers include mono and multi-functional acryaltes, acryalted polyurethane, and acrylated epoxy. Water soluble polymers include polyethylene oxide and polyvinylpyrrolidone.

Polymers which alone are not readily melted by heating but which in conjunction with particulate solids of the kind referred to above, are reduced to low viscosity liquids on heating are an important class of polymers which may be used in this invention. Specific examples of such polymers are nitrocellulose, ethyl cellulose, ethyl hydroxy ethyl cellulose and cellulose acetate butyrate.

Heat softenable polymers also include cross-linked types which can be softened by de-polymerization in the heating process. For example, polyester-polyurethane when heated to 330° C. or higher is very rapidly depolymerized to products with flow properties believed to consist of low molecular weight polyesters and polyisocyanates. These components subsequently repolymerize at room temperature over about 24 hours.

The support sheet should preferably have relatively low absorbency for the heated transfer layer to ensure transfer of a substantial proportion of the transfer layer. The support sheet absorbency should be lower than that of the substrate and the carrier sheet should not soften at transfer temperature. Absorbency is measured by the oil absorption value and very low values are obtained with paper carriers by parchmentizing, coating, impregnating or laminating the paper or by using highly beaten pulp and re-generated cellulose. Specific examples of suitable carrier sheets are vegetable parchment paper, glassine paper, machine coated art paper and regenerated cellulose film.

Plastic film support sheets may also be used, such as polyester and even polypropylene at suitable transfer temperatures and these films may also be used laminated to a paper base. It is also possible to use carrier sheets having marked release properties such as silicone or "Quilon" (Registered Trade Mark) coated or impregnated paper, and in such cases the extremely poor printability of these support sheets is overcome by applying a continuous transfer layer to the carrier sheet and superimposing the design on the transfer layer.

Suitable equipment for heat transfer of individual transfer sheets prepared in accordance with the invention comprises a heated platen with means for applying pressure to the transfer sheet and substrate assembly. A heated drum is used for transfer when the transfer sheet is in continuous web form. The transfer calendars used for vapor phase transfer are suitable and usually a far faster operating speed may be used with transfer sheets of the present invention because the dwell time is shorter than in the vapor phase transfer process. Vacuum assistance can be used to increase flow into the substrate by reducing the air pressure beneath the substrate. Heating of the transfer layer need not be carried out simultaneously with the application of pressure, and the fastest heat transfer is obtained by direct flame impingement on the transfer layer using a ribbon gas burner directed onto a continuous web of transfer sheet as this is passed around a water cooled cylinder. Immediately after leaving the burner, the transfer web meets the substrate web, which may be pre-heated and both are passed through the pressure of a pair of nip rolls. The temperature to which the transfer layer is heated and the temperature in the nip can be readily controlled and very high speeds are achieved. When the coloring matter consists of watersoluble dyes or latent dyes, steam or super-heated steam may be used for the heating process.

The entire transfer sheet is normally heated uniformly so that the entire design is transferred. Heat may, however, also be localized by using conduction heating with a heated metal die to produce a transfer which reproduces the outline form of the die. At the present time it is thought that the transfer of the molten transfer layer to the substrate takes place in a similar way to the transfer of a liquid ink layer in conventional printing, i.e. the ink layer shears transversely and the proportion of the ink film which is transferred to the substrate depends on various known factors, such as the viscosity of the ink and the absorbency of the substrate.

Pigments are dispersed, in the transfer or design layers, to produce colored effects. Dyes soluble in the polymer base or design layer constituents are also suitable. Latent dyes consisting of textile dyes such as fiber reactive dyes, disperse dyes, direct dyes, acid dyes and leuco dyes may also be incorporated in the transfer or design layers and the color and fastness of these dyes on textile substrates is developed by use of heat, steam or super-heated steam in the heat transfer process or subsequently. Dyeing assistants may also be incorporated to assist color development on the textile such as finely dispersed solid particles of sodium carbonate for fiber reactive dyes and a finely dispersed particle of an acid for acid dyes for wool and nylon. Vat dyes require the incorporation of both alkali and a reducing agent such as sodium formaldehyde sulphoxylate.

The preparation of heat transfers in accordance with the invention and their use in decorating textile and other sheet materials is illustrated by the following Examples.

EXAMPLE 1

A clear transparent transfer layer is produced on a carrier sheet of vegetable parchment paper by applying the following liquid composition in which quantities are in parts by weight.

| | | |
|---|---|---|
| 1. | Epoxy polymer as 60% solids solution in ethoxyethanol (solution weight) | 19.8 |
| 2. | Amino polymer as 20% solids solution in ethoxyethanol | 6.6 |
| 3. | Phenoxy polymer as 32% solids solution in ethoxyethanol acetate | 22.0 |
| 4. | Finely ground solid meltable material, dicyclohexyl phthalate | 46.3 |
| 5. | Ethoxyethanol | 5.3 |
| | | 100.0 |
| | Non volatiles | 68.3% |
| | Solid meltable material as a % of total non volatiles | 68% |

The heat softenable epoxy polymer is a low molecular weight polymer containing reactive epoxy terminal groups and the amino-resin is a cross-linking agent prepared by reacting ethylenediamine with low molecular weight epoxy resin to produce blocked amino groups which do not react with further epoxy resins at room temperature but only react when heated. The phenoxy polymer is a heat softenable linear polyether derived from bis-phenol. A and epichlorhydrin without terminal epoxy groups and has a relatively high molecular weight of 15,000–30,000. The dicyclohexyl phthalate is a solid plasticizer for polymer components 1,2 and 3 and melts at 69° C.

The resulting composition was applied to one surface of the support sheet by coating or screen printing to give a range of dry coating weight of 5–30 gsm depending on the substrate to be decorated and the decoration effect required. The variation in dry layer thickness produced by screen printing is obtained by printing with monofilament polyester meshes varying from 200 mesh/cm to 32 mesh/cm respectively. The wet carrier layer was dried by evaporation on a hot air dryer at an air temperature not exceeding 40° C. This clear transfer layer has a fine matt finish when dry and is non-blocking on storage and is not damaged by handling. It exhibits excellent liquid flow properties when heated to 150°–180° C. and will transfer to a range of textile substrates such as thin woven cotton fabric, lock-knit cotton jersey, knitted polyester and woven demin when applied under a pressure of 1–5 psi for a dwell time of 5–15 seconds.

EXAMPLE 2

Transfer sheets prepared in accordance with Example 1, having a coating weight of 20 gsm are overprinted by 4-color offset litho using the following inks:

| | | |
|---|---|---|
| 1. | Trichromatic yellow pigment (colour index pigment yellow 13) | 14.0 |
| 2. | Polymer solution | 40.0 |
| 3. | Microfine polyethylene wax | 2.0 |
| 4. | Methyl ethyl ketoxime | 1.0 |
| 5. | Polymer solution | 30.0 |
| 6. | Aliphatic Hydrocarbon boiling point 260-290 C. | 9.0 |
| | | 100.0 |
| 7. | Polymer solution: | |
| | Pheonlic modified resin ester | 50.0 |
| | Non yellowing vegetable oil | 10.0 |
| | Distillate 6 pt. 260-290 C. | 40.0 |
| | | 100.0 |

The yellow pigment was dispersed on a triple roll mill into items 2,3 and 4 and then items 5 and 6 are then added to obtain the required ink viscosity and tack value.

The magenta, cyan and black inks of the four color set were similarly prepared by replacing the yellow pigment with:

| | |
|---|---|
| Trichromatic magenta pigment (colour index pigment Red 57) | 18 |
| Trichromatic cyan pigment (colour index pigment Blue 15) | 16 |
| Trichromatic black pigment (carbon | 18 |
| Black plus colour index pigment Blue) | 1 |

Printing was carried out on a single color or multi-color lithographic printing press using the colour sequence yellow, magenta cyan and black. Excellent print quality was obtained and the inks set very rapidly due to the matt carrier layer surface. The printing was allowed to dry overnight.

The resulting over printed transfer sheet was tested by application to T-shirts composed of knitted cotton jersey using a platen press. The upper platen was heated to 180° C. and the transfer sheet placed in register on the T-shirt which itself was placed on the lower platen which was covered with a 1 cm thick layer of silicone rubber. The platen was closed to give a pressure of 1.5 psi for a 5 second dwell and on opening the press and removing the support sheet while still warm, the printed design was substantially transferred to the T-shirt fabric leaving only a small residue of the support sheet. The handle, scratch properties and air-permeability of the fabric are essentially unchanged and the transferred design shows substantial penetration into the fabric and is not present as a surface skin. The decoration has high resistance to re-ironing, washing dry-cleaning and wet and dry rub-resistance.

EXAMPLE 3

A clear transparent transfer layer was coated onto vegetable parchment carrier sheet using a liquid coating composition having the following composition applied by reverse roll coating to give a continuous layer. The layer was dried by evaporation with warm air at 40° C. and had a dry coating weight in the range of 5-50 gsm the specific value being selected to suit the substrate to be decorated.

| | | |
|---|---|---|
| 1. | Polyvinylbutral at 30% solids solution in ethoxyethanol | 7.5 |
| 2. | Isobutylated melamine-formaldehyde polymer as 55% solids in isobutanol | 16.5 |
| 3. | Dicyclohexylphthalate | 42.5 |
| 4. | Ethoxyethanol | 33.5 |
| | | 100.0 |
| | Non volatiles | 53.8% |
| | Solid meltable material as a % of total non volatiles | 79.0% |

The polymer solution and solvent (1,2 and 4) were mixed and the finely ground solid plasticizer powder (3) added with high speed stirring at room temperature just before coating or printing. The dry transfer sheet was non-blocking and could be stacked or re-reeled and had a fine matt finish with excellent printability and drawing properties. Polymer (1) is heat softenable and cross-links on heating with polymer (2) which is a very soft low molecular weight material.

EXAMPLE 4

A gravure printing ink of the following composition was printed directly onto a glassine paper carrier to provide a pigmented transfer layer:

| | | |
|---|---|---|
| 1. | Acrylic copolymer | 25.0 |
| 2. | Hexa hydroxymethyl malamine | 8.0 |
| 3. | p.Toluene sulphonamide | 42.0 |
| 4. | Toluene | 25.0 |
| | | 100.0 |
| 5. | Organic Pigment | 5.0 |

The particulate solid (3) was mixed by high speed stirring into a cold solution of polymers (1 and 2) dissolved in solvent (4). The pigment (5) was ground into the liquid ink vehicle and additional solvent (5) added to adjust viscosity to suit the gravure press.

The polymer base (1 and 2) of this ink if heated to 180° C. is a highly viscous mass with inadequate flow properties for printing textiles. The dry ink vehicle containing the solid (3) when heated to 180° C. give a liquid of low viscosity (about 1 poise) having excellent flow properties, due to the plasticizing action of the solid material (3).

EXAMPLE 5

Decorative or identification markings were produced on the transfer layer of the sheets prepared in accordance with Example 1 by drawing using a felt-tip pen containing an ink consisting of solvent-soluble dyes in solution in hydrocarbon solvent. The drawing dries rapidly by evaporation and absorption of solvent into the transfer layer and after heat transfer to cotton, silk, wool or polyester fabrics a sharp print is obtained with excellent fastness properties. Similar drawing can also be carried out on the transfer layer after this has already been decorated by printing so that composite printed and drawn designs can be produced.

EXAMPLE 6

A clear transparent transfer layer of the following composition was applied as a uniform coating to vegetable parchment of 72 gsm by reverse roll coating to give a dry weight of 16 gsm.

| | | |
|---|---|---|
| 1. | Hydroxyl functional polyacrylate as 50% solids in butanolxylol solvent | 40.0 |
| 2. | Melamine-formaldehyde polymer as 50% solids in butanolxylol solvent | 40.0 |
| 3. | Stearamide | 20.0 |
| | | 100.0 |
| | Non volatiles | 60% |
| | Solid meltable material as a % of total non volatiles | 33% |

The polymer (1) is a heat softenable low molecular weight material and the solid meltable material (3) is added to the hot polymer solution so that it melts and the mixture is cooled to room temperature with gentle stirring to give a fine dispersion of the solid meltable particles in the polymer solution.

EXAMPLE 7

Example 1 was repeated except that the dicyclohexyl phthalate was replaced with the same concentration of Heptachloronaphthalene.

The resulting transfer functioned in a similar way to that of Example 1 but additionally imparted a substantial degree of flame resistance properties to cotton, wool, polyester and nylon.

EXAMPLE 8

Example 1 was repeated except that an intumescent agent (4:4'-dinitro sulfanilide in an amount of 20%) was also included in the lacquer. The intumescent agent swells or expands and poduces a foamed charred mass when exposed to very high temperatures such as a flame 4:4'-dinitro sulfanilide has an intumescent temperature of 220° C. so heat transfer should be conducted at a substantially lower temperature e.g. 150° C.

EXAMPLE 9

A transfer layer produced entirely by offset litho printing was prepared as follows in which a solid, non-tacky meltable material is incorporated in the transfer layer by application as a dry powder to the wet printing ink.

| | | |
|---|---|---|
| 1. | 50% w/w solution of rosin ester in petroleum distillate 260–290° C. | 73.00 |
| 2. | Linseed stand oil, 30 poise | 9.00 |
| 3. | Copper phthalocyanine, β form | 18.00 |
| | | 100.00 |

Item 1

The heat softenable polymer consists of dimerized rosin esterified with penetaerythritol having softening point of approximately 188° C. This is dissolved in low KB aliphatic hydrocarbon solvent 260°–290° C. to give a 50% w/w solution.

Item 2

Linseed stand oil is added to the polymer solution to improve the printability of the litho ink.

Item 3

This is a trichromatic blue pigment which is dispersed in the mixture of 1 and 2 on a triple roll mill to a Hegman grind of 6.

This ink was printed by offset litho onto machine coated art paper and a dry powder spray of p-toluenesulphanamide was applied to the printed sheet to cover and adhere to all the web ink areas before stacking. Alternatively the web printing can be passed through a bronzing machine in which the bronze powder is replaced by p-toluenesulphonamide which is the non-tacky meltable material having m.p. of 136° C. The dry powder renders the printing non-tacky so that sheets may be stacked in large numbers.

Transfer to thin woven fabric was carried out for 5 seconds at 180° C. under a pressure of 2 psi. The powder melts at a low viscosity liquid having a solvent action on the polymer base producing a liquid which flows into the fabric.

Approximately 70% of the transfer layer was transferred to the fabric with good penetration and 30% is retained in the machine coated art paper. By replacing the art paper by vegetable parchment paper, approximately 80% transfer is effected due to the lower absorbency of the latter paper.

EXAMPLE 10

A colorless lithographic ink was prepared using the formulation of Example 9 in which the colored pigment is replaced by p-toluenesulphonamide at 35% concentration. This ink was first printed as a colorless transfer layer onto the paper and overprinted by the 4 color half-tone litho inks of Example 9 and p-toluenesulphonamide applied to the colored ink as a dry powder before stacking. The whole printing operation was carried out on a multicolor press so that only a single application of dry powder is applied prior to print stacking.

The colorless layer and ink layers form a composite transfer layer. Transfer in the same manner as in Example 9 produced over 90% efficiency of color transfer with excellent fabric penetration.

EXAMPLE 11

A photopolymerizable colorless transfer layer was produced on vegetable parchment carrier sheets by coating or screen printing the following liquid composition and drying by evaporation of the solvent at less than 50° C.

| | | |
|---|---|---|
| 1. | Acrylated Polyurethane | 17.1 |
| 2. | 2-Phenoxyelthylacrylate | 7.3 |
| 3. | Benzophenone | 1.7 |
| 4. | Benzyl dimethyl ketal | 0.7 |
| 5. | Michler's ketone | 0.07 |
| 6. | Butoxyethanol | 24.4 |
| 7. | p Toluenesulphonamide | 48.73 |
| | | 100.00 |

Item 1 is a difunctional ethylenically unsaturated photopolymerizable prepolymer.

Item 2 is a photopolymerizable monomer.

Items 3, 4 and 5 are photoinitiators.

Item 6 is a volatile solvent

Item 7 is a low temperatures meltable solid material.

The liquid composition was prepared by mixing the toluenesulphonamide into the solution obtained by mixing the remaining items.

The resulting dry transfer layer has a matt surface which is non-blocking and was then over-printed with the colored inks of Examples 2,4 or 5.

Alternatively, the liquid composition may be colored by dispersion of pigments on a triple roll mill and applied as a single transfer layer by screen printing to the carrier sheet.

Transfer to textile fabric was carried out at 160° C. and 0.1 kg/cm$^2$ pressure for 4 seconds and after hot stripping to remove the support sheet the transferred design is photopolymerized and cross-linked by ultra violet radiation using a 3 cm. diameter tubular quartz mercury vapor lamp operating at 80 watts per centimeter of tube length, the fabric passing beneath the lamp at a distance of 2 cms. at a speed of 100 meters per minute. Cross-linking renders the transfer non-softenable by heat and increases wash-fastness and dry-clean resistance.

EXAMPLE 12

A clear, colorless lacquer was prepared by mixing the following materials:

| | | |
|---|---|---|
| 1. | Melamine formaldehyde-epoxy copolymer as 60% w/w concentration in 1:1 n-butanol-xylene | 62.5 |
| 2. | Dimethyl-terephthalate | 37.5 |
| | | 100.00 |

The dimethyl-terephthalate was present as 50% on total non-volatiles.

This composition was applied as a colorless transfer layer as in Example 1 except that composition can be dried at 100° C. without melting item 2.

The non-blocking transfer sheet is overprinted by offset litho using the inks of Example 9 to give excellent print quality.

Transfer is carried out at 170° C. for 10 seconds using a pressure of approximately 0.1 kg/$cm^2$ and the heat transfer and hot stripping operation is conducted in an air stream which removes the dimethyl-terephthalate as a vapor which condenses as crystals when the exhaust air is cooled. The sublimable material is therefore substantially removed during transfer and is recovered for re-use.

What we claim is:

1. A method of marking or decorating a textile or other absorbent surface with a design, said method comprising the steps of:
   (a) providing a heat transfer including a flexible support substrate coated with a solid printing ink layer embodying the design to be transferred,
   (b) contacting the printing ink layer face to face with the textile under conditions of temperature and pressure which do not damage the textile and which cause the solid printing ink layer to melt to a liquid ink composition having a viscosity less than 100 poise and to penetrate the textile and transfer the ink layer to the textile as a nonlabel like design,
   (c) separating the support substrate from the textile with the transferred design being retained in the form of solid ink within the textile,
   (d) said solid printing ink layer being substantially non-tacky and non-blocking at room temperature and including at least one polymer having solid particles of a tack reducing agent present as a separate phase in at least a surface portion of the layer,
   (e) said tack reducing agent being sublimable at said elevated temperature or having a melting point of at least 60° C. and melting at said elevated temperature to a liquid which reduces the viscosity of the polymer composition.

2. The method as defined in claim 1 wherein said tack reducing agent being sublimable at the temperature pertaining during step (b).

3. The method as defined in claim 1 wherein said tack reducing agent having a melting point above 60° C. and melts at the temperature pertaining during step (b) to liquid which does not increase the viscosity of the molten ink.

4. A method as defined in claim 1 wherein the support substrate has an absorbency which is lower than that of the textile or other receptor surface.

5. A method as defined in claim 1 wherein the liquid ink layer shears transversely during transfer and a substantial proportion of said layer is transferred to the textile or other receptor surface.

6. A method as defined in claim 1 wherein the heat transfer and/or the textile or other receptor are preheated prior to placing the ink layer and receptor in face to face contact.

7. A method as defined in claim 6 wherein the heating is effected by direct flame impingement.

8. A method as defined in claim 1 wherein said substrate includes a sheet or web.

9. A method of marking or decorating a textile or other absorbent surface with a design, said method comprising the steps of:
   (a) providing a heat transfer including a flexible support substrate coated with a solid printing ink layer which constitutes a carrier for said design to be transferred,
   (b) contacting the printing ink layer face to face with the textile under conditions of temperature and pressure which do not damage the textile and which cause the solid printing ink layer to melt to a liquid ink composition having a viscosity less than 100 poise and to penetrate the textile and transfer the ink layer to the textile as a non-label like design,
   (c) separating the support substrate from the textile with the transferred design being retained in the form of solid ink within the textile,
   (d) said solid printing ink layer being substantially non-tacky and non-blocking at room temperature and including at least one polymer having solid particles of a tack reducing agent present as a separate phase in at least a surface portion of the layer,
   (e) said tack reducing agent being subliminal at said elevated temperature or having a melting point of at least 60° C. and melting at said elevated temperature to a liquid which reduces the viscosity of the polymer composition.

10. A method of marking or decorating a textile or other absorbent surface with a design, said method comprising the steps of:
   (a) providing a heat transfer including a flexible support substrate coated or printed with a solid, thermoflowable polymer layer having a design to be transferred associated therewith,
   (b) placing the thermoflowable layer and the textile or other material in face to face contact under conditions of temperature and pressure which do not damage the textile or other material and which cause the polymer layer to melt to a liquid ink and to have a viscosity less than about 30 poise at transfer temperature and to penetrate the surface of the textile or other material, whereby the design embodied in said ink layer is transferred to and incorporated in the textile or other material, which substantially retains its original air-permeability, handle and surface texture,
   (c) separating the support substrate from the textile or other material with the transferred design being retained within the textile or other material,
   (d) said thermoflowable polymer layer being substantially non-tacky at room temperature and having solid particles of a tack reducing agent present as a separate phase in the polymer composition, and
   (e) said tack reducing agent being sublimable at said transfer temperature or having a melting point of at least 60° C. and melting at said transfer temperature to a liquid which is miscible with the thermoflowable composition to increase the flow thereof.

11. A method as defined in claim 10 wherein the support substrate has an absorbency which is lower than that of the textile or other receptor surface.

12. A method as defined in claim 10 wherein the liquid ink layer shears transversely during the transfer and a substantial proportion of said layer is transferred to the textile or other receptor surface.

13. A method as defined in claim 10 wherein the heat transfer and/or the textile or other receptor are preheated prior to placing the ink layer and receptor in face to face contact.

14. A method as defined in claim 13 wherein the heating is effected by direct flame impingement.

15. A method as defined in claim 10 wherein said substrate includes a sheet or web.

16. A method as defined in claim 10 wherein said thermoflowable polymer layer embodies said design to be transferred.

17. A method as defined in claim 10 wherein said thermoflowable polymer layer constitutes a carrier for said design to be transferred.

18. A heat transfer for decorating or marking textiles and other absorbent surfaces, said transfer comprises:

(a) a flexible substrate means having a contiguous layer of a solid printing ink located thereon, (b) said layer being substantially non-tacky and non-blocking at normal room temperature, and, at an elevated temperature, melting to a liquid having a viscosity less than 100 poise and being effective to permit printing of a textile or other surface pressed in contact therewith, (c) said solid printing ink layer having at least a heterogeneous surface portion wherein particles of a tack reducing agent are present as a separate phase in a polymer composition, (d) said tack reducing agent being sublimable at said elevated temperature or having a melting point of at least 60° C. and melting at said elevated temperature to a liquid which reduces the viscosity of the polymer composition.

19. A transfer as defined in claim 18 wherein the polymer composition includes a polymer having reversible thermolabile cross-links so that on heating sufficient cross-links are opened to form a flowable liquid and on cooling the cross-links are reformed and the polymer reconverts to a solid.

20. A heat transfer as defined in claim 18 wherein the substrate means is a support sheet or web.

21. A heat transfer as defined in claim 18 wherein the solid particles of tack reducing agent are introduced into the printing ink layer by cooling a hot solution of the tack reducing agent in the polymer composition to form a dispersion of the tack reducing agent therein.

22. A heat transfer for decorating or marking textiles and other absorbent surfaces, said transfer comprises:

(a) a flexible substrate coated with a solid printing ink layer, (b) said layer being substantially non-tacky and non-blocking at normal room temperature and, at elevated temperature, melting to a liquid having a viscosity less than 100 poise and being effective to permit printing of a textile or other surface pressed in contact therewith by liquid ink transfer, (c) said solid printing ink layer having at least a heterogeneous surface portion wherein a tack reducing agent is dispersed as discrete, solid particles in a polymer composition, and (d) said tack reducing agent having a melting point greater than 60° C. and melting to a liquid at the transfer temperature, said agent being selected from esters, amides, ketones and halogen derivatives of aromatic, cycloaliphatic and aliphatic hydrocarbons, including aliphatic, aromatic and cycloaliphatic phthalates and terephthalates, sulphonamide, octadecanamide, toluene sulphonamide, cyclohexyl sulphonamide, heptachloronaphthalene, and low molecular weight polyesters and polyamides and polyethylene.

23. A heat transfer as defined in claim 22, wherein the polymer composition includes at least one polymer selected from heat-softenable acrylic, methacrylic, amino-formaldehyde, epoxy, vinyl, linear polyesters, alkyds, hydrocarbon resins, polyamides, polyurethanes and chlorinated rubbers and polymers which, in conjunction with the tack reducing agent, melt to a low viscosity liquid.

24. A heat transfer as defined in claim 22 wherein the polymer composition includes a synthetic polymer capable of undergoing cross-linking on heating.

25. A heat transfer for decorating or marking textiles and other absorbent materials, said transfer comprising:

(a) a flexible support sheet or web having a contiguous transferable design layer of a solid thermoflowable polymer composition located thereon, (b) said layer containing solid particles of tack-reducing agent as a separate phase in at least the surface of said polymer composition, and said layer being substantially non-tacky and non-blocking at normal ambient temperature, (c) said tack reducing agent being sublimable at an elevated transfer temperature or having a melting point of at least 60° C., and (d) said thermoflowable composition being meltable to a liquid ink which has a viscosity less than 30 poise at transfer temperature which is effective in printing a textile or other absorbent material with said design when pressed into contact therewith and to penetrate the surface of said textile or other material whereby the printed textile or other material substantially retains its original air permeability, handle and surface texture.

26. A transfer as defined in claim 25 wherein the thermoflowable composition is meltable to a liquid ink having a viscosity of 1 to 10 poise or less.

27. A transfer as defined in claim 25 wherein the thermoflowable composition includes a synthetic polymer having reactive groups which cross-link at the transfer temperature on further heating.

28. A transfer as defined in claim 25 wherein the transferable design layer comprises a solid thermoflowable polymer composition which is coated or printed onto the substrate and constitutes a carrier for a design formed in dyes or pigments and applied over said thermoflowable composition.

29. A transfer as defined in claim 25 wherein the thermoflowable composition incorporates the design and is applied to the substrate by printing.

30. A transfer as defined in claim 25 wherein the tack reducing agent when molten is miscible with the remainder of the molten thermoflowable composition to increase the flow thereof.

31. A heat transfer for decorating or marking textiles and other absorbent materials, said transfer comprising:

(a) a flexible carrier web or sheet having a substantially non-tacky and non-blocking contiguous transferable design layer of a solid thermoflowable polymer composition located thereon, (b) said polymer composition including at least one synthetic polymer melting to a liquid which has a viscosity less than 100 poise at transfer temperature, (c) said layer having in at least its exposed surface portion solid particles of a tack reducing agent which is present as a separate phase in said polymer composition, (d) said tack reducing agent being sublimable at a transfer temperature or having a melting point of at least 60° C., and being selected from esters, amides, ketones and halogen derivatives of aromatic, cycloaliphatic and aliphatic hydrocarbons, including aliphatic, aromatic and cycloaliphatic phthalates and terephthalates, sulphonamide, octadecamide, toluene sulphonamide, cyclohexyl suphonamide, heptachloronaphthalene and low molecular weight polyesters and polyamides and polyethylene, and (e) said thermoflowable composition being meltable at the transfer temperature to a liquid ink having a viscosity less than about 30 poise, which is effective in printing a textile or other absorbent material with said design when pressed into contact therewith and to penetrate the surface of said textile or other absorbent material whereby the printed textile or other material substantially retains its original air-permeability, handle and surface texture.

32. A transfer as defined in claim 31 wherein said synthetic polymer comprises at least one heat-softenable synthetic polymer selected from acrylic, methacrylic, epoxy, aminoformaldehyde, vinyl, linear polyester, alkyd, hydrocarbon, polyamide, polyurethane, chlorinated rubber or other polymer which melts to a low viscosity liquid.

33. A transfer as defined in claim 32 wherein the polymer composition includes at least one heat-softenable acrylic polymer which is capable of cross-linking at transfer temperature.

34. A transfer as defined in claim 33 wherein the polymer composition includes an epoxy resin capable of melting to a low viscosity liquid at transfer temperature.

* * * * *